Feb. 14, 1939.  T. A. BAKER  2,147,513
AUTOMATIC TEMPERATURE REGULATING DEVICE
Filed Dec. 9, 1936  2 Sheets-Sheet 2

Inventor:—
Terry A. Baker
By Smith, Michael & Gardiner,
Attorneys.

Patented Feb. 14, 1939

2,147,513

UNITED STATES PATENT OFFICE 2,147,513

AUTOMATIC TEMPERATURE REGULATING DEVICE

Terry A. Baker, McAllen, Tex.

Application December 9, 1936, Serial No. 115,037

3 Claims. (Cl. 236—12)

My invention relates to an automatic temperature regulating device, and has particular reference to a device for receiving fluids of different temperatures, mixing or blending such fluids, and discharging the mixture at a definite, predetermined temperature.

It is an object of my invention to provide an automatic temperature regulating device including a mixing chamber, inlet openings leading to said chamber, and an outlet opening leading from said chamber, and to provide automatic means responsive to temperature changes for controlling the inlet openings to insure a predetermined temperature of the fluid leaving the mixing chamber through the outlet opening thereof. While the device of my present invention finds particular utility in connection with bathroom showers and the like, where it is desired to mix or blend the "hot" and "cold" water to produce a wash-water of a predetermined temperature, it is to be understood that the device is not limited to such use, but is capable of use in connection with other domestic and/or industrial installations where it is desired to mix different temperature fluids, either liquids or gases, to provide a fluid discharge of a definite, predetermined temperature.

It is a further object of my invention to provide an automatic temperature regulating device in which an oscillating valve member, actuated in response to temperature changes, functions to control the inlet ports to a mixing chamber in such a manner that the opening or closing of one inlet port results in the reverse action at the other port to thereby proportion the fluids of varying temperatures to result in the discharge of fluid at the desired temperature.

It is a further object of my invention to provide an automatic temperature regulating device that can be readily adjusted to insure the discharge of fluids at varying temperatures resulting from the mixing or blending of different temperature fluids, and in which the different temperature fluids are mixed or blended prior to their contact with a temperature-responsive element which controls the proportion of "hot" and "cold" fluids entering into the mixture.

It is a still further object of my invention to provide a device of the above mentioned character that is simple in construction and operation; easy to manufacture, assemble and disassemble; strong and durable; and highly efficient in the purposes for which designed.

Figure 1:
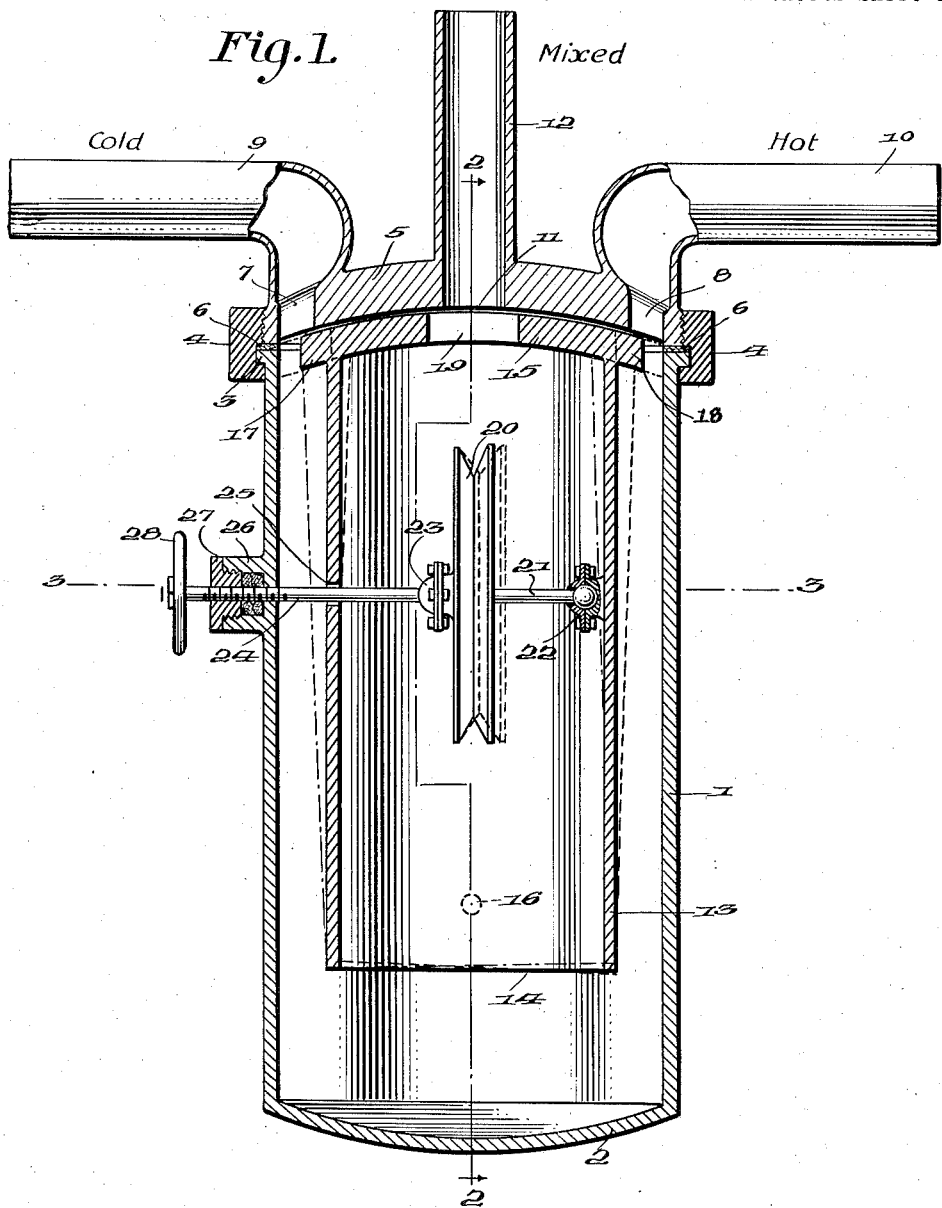
Figure 2:
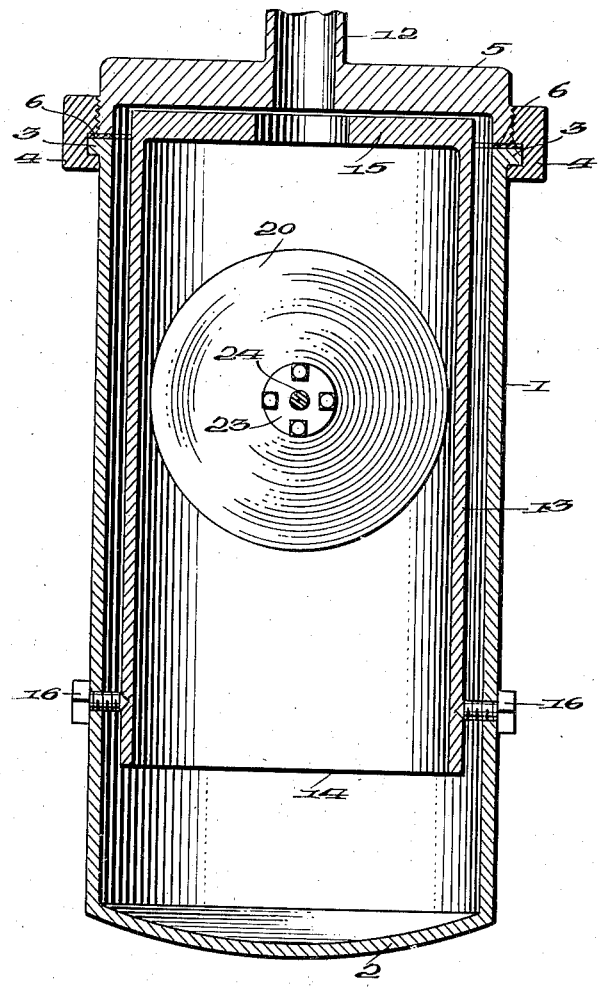
Figure 3:
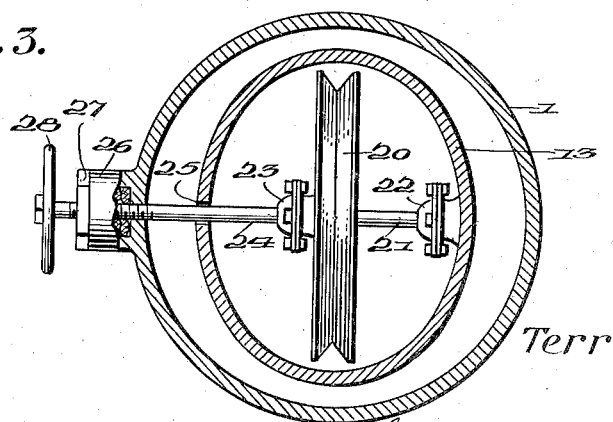

In the accompanying drawings forming a part of this specification and wherein for the purposes of illustration, I have shown a preferred embodiment of my invention, Figure 1 is a central vertical sectional view of an automatic temperature regulating device embodying the features of my invention, Fig. 2 is a vertical sectional view of the said device, on the line 2—2 of Fig. 1, and Fig. 3 is a transverse sectional view of the said device on the line 3—3 of Fig. 1.

In the accompanying drawings wherein like reference characters have been employed to designate like parts throughout the several views, the numeral 1 designates an outer casing, preferably cylindrical in transverse cross-section, and having a closed bottom 2. The upper, open end of the casing 1 is provided with a radially extending flange 3 which cooperates with an annular coupling member 4 provided with internal screw-threads adapted to engage threads provided on the exterior of a cover 5. Interposed between the upper surface of the flange 3 and the lower surface of the cover 5 is a packing gasket 6, it being obvious that as the annular coupling member 4 is screwed onto the cover 5, the said coupling member will rigidly secure the cover 5 to the casing 1, and that the packing gasket 6 will function to provide a leak-tight joint between these parts.

The cover 5 is provided at diametrically opposite positions with inlet openings 7 and 8 communicating with pipes 9 and 10 respectively, and is further provided with a centrally-positioned outlet or discharge opening 11 communicating with a pipe 12. The inner ends of the pipes 9 and 10, and the inlet openings 7 and 8, are shaped to provide openings having a relatively narrow radial dimension, the total area of each of said openings 7 and 8 corresponding substantially to the total cross-sectional area of each of the pipes 9 and 10, so as to provide for free and unrestricted flow of fluid from the pipes, through the openings, and into the casing 1.

Within the casing 1, I provide a hollow oscillating valve member 13, preferably elliptical in transverse cross-section, and having an open bottom 14 and a closed top 15. This hollow valve member 13 is pivotally mounted within the casing 1 by means of pivot-screws 16 which extend through the casing 1 at diametrically opposite points and have their inner ends engaged within recesses provided in the outer wall of the valve member 13. The two pivot-screws 16 are located in a vertical plane extending at right angles to a vertical plane including the inlet openings 7 and 8 so that the valve member 13 may oscillate about the pivot-screws 16 in a direction to cover or uncover the said inlet openings, it being noted that the closed top 15 of the valve member is provided with diametrically opposite, radially extending projections 17 and 18, positioned immediately beneath, and coextensive with, the inlet openings 7 and 8, respectively. The length of the projections 17 and 18 is such that when the valve member 13 is rocked about the pivot-screws 16 to its extreme left position as viewed in Fig. 1 of the accompanying drawings, the inlet opening 7 will be completely closed and the inlet opening 8, completely opened, and when rocked to its extreme right position as viewed in said figure, the inlet opening 8 will be completely closed and the inlet opening 7 completely opened. The top 15 is provided with a central opening 19 considerably larger in diameter than the opening 11, so that regardless of the position of the valve member 13 with respect to the inlet openings 7 and 8, there will be free and unrestricted flow of the fluid from within the hollow valve member 13, through the opening 11, to the discharge or outlet pipe 12. The under surface of the cover member 5 and the upper surface of the top portion 15 of the hollow valve member 13 are similarly curved on a radius extending from the pivot-screws 16 and are slightly spaced from each other so that the said valve member may be freely oscillated about the pivot-screws 16.

As a means for regulating the position of the oscillating valve member 13 to control the amount of fluid entering the casing 1 through the inlet openings 7 and 8, I provide a temperature responsive element, preferably of the "expansible-contractible" type, such temperature responsive elements being available in various forms, all of which are old and well known in the art and form, per se, no part of my present invention. While any form of "expansible-contractible fluid" or "expansible-contractible solid" type of temperature responsive element may be used, I have shown a bellows 20 located within the hollow valve member 13 and containing a suitable liquid or gas which expands and contracts in accordance with the surrounding temperature. Thus, when the temperature of the fluid within the hollow valve member 13 is high, the bellows will expand, and when the temperature of said fluid is low, the bellows will contract. One side of the bellows 20 is connected to the inner surface of the hollow valve member 13 by means of a rod 21 and swivel joint 22, and the opposite side of said bellows is provided with a swivel joint 23, from which extends a rod 24, which passes through an opening 25 extending through the wall of the hollow valve member 13, this opening 25 being of sufficient size to permit the rod 24 to extend therethrough regardless of the inclination of the hollow valve member 13. The outer end of the rod 24 passes through a suitable packing gland 26 extending from the outer side of the casing 1 and has its threads engaged with the threads of a fixed nut 27. The outer end of the rod 24 is provided with an adjusting wheel or handle 28 which is keyed or otherwise fixed to the said rod so that rotation of the said wheel or handle will cause the rod 24 to thread through the fixed nut 27 to shift the position of the bellows 20, this shifting of the bellows determining the temperature at which the fluid leaves the discharge pipe 12.

Referring now to the operation of the automatic temperature regulating device above described, and assuming, for the purpose of disclosure, that the said device is to be used in connection with a shower bath, the inlet pipe 9 is connected with a source of cold water and the pipe 10, with a source of hot water, while the pipe 12 is connected to the shower bath spray head, the water adapted to flow through the pipes 9 and 10 being under sufficient pressure to cause the water to continuously flow through the device from the inlet to the outlet opening thereof. Assuming that the parts occupy the position shown in full lines in Fig. 1, and that the valve controlling the supply of water through the pipes 9 and 10 are opened, the cold and hot water will enter the casing 1 through the inlet openings 7 and 8, respectively; will pass downwardly through the space defined by the inner wall of the casing 1 and the outer wall of the hollow valve member 13; will pass upwardly through the said hollow valve member; past the temperature responsive control element 20; through the openings 19 and 11; and through the pipe 12 to the shower spray head, having ample time during this flow to thoroughly mix and blend and to attain a uniform temperature by the time it reaches the temperature responsive element 20. The wheel or handle 28 is adjusted so as to position the element 20 to provide the desired temperature for the water passing out of the discharge pipe 12 to the shower spray head. After this setting of the element 20, if the water as it contacts with the said element is of a higher temperature than that for which the element 20 has been previously set, the element 20 will expand and the rod 21 and its swivel connection with the valve 13 will cause said valve to move about the pivot-screws 16 to a position where the projection 18 will partially close the inlet opening 8, thus decreasing the amount of hot water supplied through said inlet opening. Simultaneously with the partial closing of the inlet opening 8, the projection 17 will move from beneath the inlet opening 7, thereby increasing the amount of cold water supplied through said inlet opening. The increased amount of cold water entering the casing 1 through the inlet opening 7, will mix with the decreased amount of hot water entering the casing 1 through the inlet opening 8 and, hence, the temperature of the water passing through the discharge pipe 12 will be reduced to correspond to the temperature for which the element 20 was adjusted.

If the temperature of the water passing through the hollow valve 13 on its way to the discharge pipe 12, falls below the temperature for which the element 20 is set, the said element 20 will contract and the rod 21 will cause the hollow valve 13 to move about the pivot-screws 16 to a position where the projection 17 will partially close the inlet opening 7, thus decreasing the amount of cold water supplied through said inlet opening. Simultaneously with the partial closing of the inlet opening 7, the projection 18 will move from beneath the inlet opening 8, thereby increasing the amount of hot water supplied through said inlet opening. The increased amount of hot water entering the casing 1 through the inlet opening 8 will mix with the decreased amount of cold water entering the casing 1 through the inlet opening 7 and, hence, the temperature of the water passing through the discharge pipe 12 will be increased to correspond to the temperature for which the element 20 was adjusted.

Obviously, the temperature responsive element 20 is selected in accordance with the specific use to which the device is to be applied and to be responsive to a range of temperatures usually encountered in the operation of the device. Assuming that the individual temperatures of the incoming "cold" and "hot" water entering the casing through the inlet pipes 9 and 10, respectively, remain substantially constant, and that the temperature responsive element 20 is set to insure the discharge of water through the pipe 12 at the desired temperature, it will be obvious that the rocking movements of the hollow valve member 13 occasioned by variations in the temperature of the water passing the element 20, will be effective to insure a uniform temperature of the water discharging through the pipe 12 to the shower head. If, for any reason, the supply of "cold" water should be cut off or materially decreased ahead of the inlet opening 7, the temperature of the water passing the element 20 would become too high for the safety and comfort of the bather, and hence, the element 20 would immediately function, in a manner as above described, to cut off the supply of "hot" water through the inlet opening 8. The device, therefore, not only functions to maintain a predetermined, uniform temperature of discharge water, but it also functions as a safety device, in that it prevents any possibility of the bather being burned by discharge water at too high a temperature. Further, if the supply of "hot" water should be cut off or materially decreased ahead of the inlet opening 8, the temperature of the water passing the element 20 would become too low for the comfort of the bather, and the automatic operation of the element 20 and rocking valve 13 would definitely prevent the discharge of "cold" water through the discharge pipe 12.

It will thus be seen that I have provided a novel form of automatic temperature regulating device, which will satisfactorily function to accomplish a proper mixing of different temperature fluids to insure a discharge of fluid at a predetermined, uniform temperature. The device comprises a minimum of parts, and, after a predetermined setting of the element 20, functions entirely automatically to accomplish the purposes for which designed. I preferably make the hollow valve member 13 elliptical in transverse cross-section in order that I might employ a relatively large temperature-responsive element 20 without materially increasing the diameter of the casing 1 or decreasing the fluid flow space between the valve member 13 and the casing 1. By providing a relatively long, hollow valve member 13 journaled near its lower end on the pivot-screws 16, and positioning the element 20 approximately half-way between the ends of said hollow valve member 13, I greatly increase the effectiveness of the device, in that the movements of the element 20, due to its expansion and contraction, are multiplied, i. e., the extent of movement of the projections 17 and 18 with respect to their cooperating inlet openings is approximately twice the extent of movement of the element 20. Expansion and/or contraction of the casing 1 or valve 13 will not interfere with the operation of the device, as the upper curved surface of the top portion 15 of the hollow valve member 13 is, preferably, slightly spaced from the correspondingly curved under surface of the cover 5.

While I have described my present invention for use in connection with a shower bath to automatically regulate the temperature of wash water, it is to be definitely understood that the device is not limited to this particular use and that the same will find utility in many other domestic and/or industrial installations. It will be understood, further, that the device is not restricted to use in connection with water or other liquids, and that the device may be used with steam, gas, or other fluids, wherein it is desired to mix fluids of different temperatures to insure a fluid discharge of a definite, predetermined and uniform temperature. It will be understood, further, that the form of my invention herein shown and described is to be taken as a preferred embodiment of the same, and that various changes may be made in the shape, size and construction of parts without departing from the spirit of my invention or the scope of the subjoined claims.

Having thus described my invention, I claim:

1. An automatic temperature regulating device comprising a tubular casing having a closed lower end, and a closed upper end provided with spaced inlet openings, said inlet openings communicating with sources of fluids of different temperatures; a tubular valve member pivotally mounted within said casing and having its side walls spaced from the walls of said casing with the space between said walls communicating with the inlet openings and having an open lower end terminating above the lower end of said casing and a closed top provided with an opening, said casing having a discharge outlet registering with the valve opening, whereby fluid streams from each inlet opening passes downwardly between the casing and the pivotally mounted valve member, then toward each other below the valve to produce intimate mixing and then upwardly through said valve member to discharge through the outlet opening, said valve member having at the top thereof portions adapted to control said fluid inlet openings; and means responsive to the temperature of the fluid passing through said casing for moving said valve member about its pivotal mounting to change the position of the valve member with respect to the inlet openings to control the temperature of the fluid passing out of said casing through the outlet opening thereof.

2. An automatic temperature regulating device comprising a tubular casing having a closed lower end, and a closed upper end provided with spaced inlet openings, said inlet openings communicating with sources of fluids of different temperatures; a tubular valve member within said casing having its side walls spaced from the walls of said casing with the space between said walls communicating with the inlet openings and having an open lower end terminating above the lower end of said casing and a closed top provided with an opening, said casing having a discharge outlet registering with the valve opening, whereby fluid streams from each inlet opening passes downwardly between the casing and valve member, then toward each other below the valve member and then upwardly through said valve member to discharge through the outlet opening, said valve member having at the top thereof portions adapted to control said fluid inlet openings; and means positioned within said tubular valve member and responsive to the temperature of the fluid passing through the valve member for moving said valve member with respect to the inlet openings to control the temperature of the fluid passing out of said casing through the outlet opening thereof.

3. An automatic temperature regulating device comprising a tubular casing having a closed lower end, and a closed upper end provided with spaced inlet openings, said inlet openings communicating with sources of fluids of different temperatures; a tubular valve member within said casing having its side walls spaced from the walls of the casing with the space between said walls in communication with the inlet openings and having an open lower end terminating above the lower end of the said casing and a closed top provided with an opening, said casing having a discharge outlet registering with the valve opening, whereby fluid streams from each inlet opening passes downwardly between the casing and valve member, then toward each other below the valve and then upwardly through said valve member to discharge through the outlet opening in the upper end of the casing, said valve member having at the top thereof portions adapted to control said fluid inlet openings; and an expansible-contractible temperature-responsive element within said casing and responsive to the temperature of the fluid therein, one side of said element being connected to said casing and the other side being connected to said valve member, whereby variations in the temperature of the fluid passing through said casing will be effective to move said valve member to control the temperature of the fluid passing out of said casing through the outlet opening thereof.

TERRY A. BAKER.